US012587992B2

(12) United States Patent
Yang et al.

(10) Patent No.: US 12,587,992 B2
(45) Date of Patent: Mar. 24, 2026

(54) FIXED RECEPTION-TRANSMISSION (RX-TX) TIME DIFFERENCE FOR RTT BASED PROPAGATION DELAY COMPENSATION

(71) Applicant: QUALCOMM Incorporated, San Diego, CA (US)

(72) Inventors: Luanxia Yang, Beijing (CN); Changlong Xu, Beijing (CN); Jing Sun, San Diego, CA (US); Xiaoxia Zhang, San Diego, CA (US); Rajat Prakash, San Diego, CA (US); Hao Xu, Beijing (CN); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 18/042,677

(22) PCT Filed: Oct. 6, 2020

(86) PCT No.: PCT/CN2020/119830
§ 371 (c)(1),
(2) Date: Feb. 23, 2023

(87) PCT Pub. No.: WO2022/073157
PCT Pub. Date: Apr. 14, 2022

(65) Prior Publication Data
US 2023/0370994 A1      Nov. 16, 2023

(51) Int. Cl.
*H04W 64/00* (2009.01)
*H04L 5/00* (2006.01)

(52) U.S. Cl.
CPC ........... *H04W 64/00* (2013.01); *H04L 5/0051* (2013.01)

(58) Field of Classification Search
CPC .. H04W 64/00; H04W 56/004; H04L 5/0051; H04L 5/0048; H04L 5/0094
See application file for complete search history.

(56) References Cited

U.S. PATENT DOCUMENTS

2017/0041841 A1 * 2/2017 Pedersen ........... H04W 56/0045
2019/0162817 A1 * 5/2019 Priyanto ............... G01S 5/0236
(Continued)

FOREIGN PATENT DOCUMENTS

CN        102158955 A      8/2011
CN        102457321 A      5/2012
(Continued)

OTHER PUBLICATIONS

Intel Corporation: "Discussion on UE RX-TX Time Difference Measurement Requirements for NR Pos", 3GPP TSG-RAN WG4 Meeting # 96-e, R4-2009743, 3rd Generation Partnership Project , Mobile Competence Centre, 650, Route Des Lucioles, F-06921 Sophia-Antipolis Cedex, France, vol. RAN WG4, No. Electronic Meeting, Aug. 17, 2020-Aug. 28, 2020, Aug. 7, 2020, XP052414210, 7 pages, Section 2.
(Continued)

*Primary Examiner* — Kabir A Timory
(74) *Attorney, Agent, or Firm* — Harrity & Harrity LLP

(57) ABSTRACT
Wireless communications systems and methods related to determining and transmitting delay measurements, such as propagation delay, between a base station (BS) and a user equipment (UE) are provided. In some aspects, a UE may receive, from a BS, a positioning reference signal (PRS). The UE may further transmit, in response to and at a predetermined time after the receiving the PRS, a sounding reference signal (SRS) to the BS. Further, the UE may receive, from the BS, a delay measurement corresponding to the PRS.

30 Claims, 10 Drawing Sheets

(56) References Cited

U.S. PATENT DOCUMENTS

| | | | | |
|---|---|---|---|---|
| 2019/0261298 A1* | 8/2019 | Yoon | .................. | H04W 56/0045 |
| 2020/0127784 A1 | 4/2020 | Akkarakaran et al. | | |
| 2020/0351815 A1* | 11/2020 | Kim | ......................... | G01S 11/04 |
| 2022/0182200 A1* | 6/2022 | Qi | ......................... | H04W 72/044 |
| 2022/0196780 A1* | 6/2022 | Dwivedi | ................. | H04W 8/12 |
| 2023/0375655 A1* | 11/2023 | Harrebek | ............. | H04B 7/0617 |

FOREIGN PATENT DOCUMENTS

| | | | |
|---|---|---|---|
| WO | 2009120461 | | 10/2009 |
| WO | 2012005929 | A1 | 1/2012 |
| WO | 2019126052 | | 6/2019 |
| WO | 2020146837 | A1 | 7/2020 |

OTHER PUBLICATIONS

Moderator (Qualcomm Incorporated): "Summary of Email Discussion [100b-e-NR-Pos-04]", R1-2002989, 3rd Generation Partnership Project, Mobile Competence Centre, 650, Route Des Lucioles, F-06921 Sophia-Antipolis Cedex, France, vol. RAN WG1, No. Online Meeting, Apr. 20, 2020-Apr. 30, 2020, May 1, 2020, XP051879549, 78 pages, Section 4.3.

Qualcomm Incorporated: "On UE Rx-Tx Time Difference Measurements for NR Positioning", 3GPP TSG-RAN WG4 Meeting #94-e, R4-2000733, 3rd Generation Partnership Project, Mobile Competence Centre, 650, Route Des Lucioles, F-06921 Sophia-Antipolis Cedex, France, vol. RAN WG4, No. Online, Feb. 24, 2020-Mar. 6, 2020, Feb. 14, 2020, XP051850704, 15 pages, Section 2.2.

Supplementary European Search Report—EP20956472—Search Authority—The Hague—Jun. 17, 2024.

International Search Report and Written Opinion—PCT/CN2020/119830—ISA/EPO—Jun. 29, 2021.

* cited by examiner

400

Receive, from a base station (BS), a positioning reference signal (PRS) — 1010

Transmit, in response to and at a predetermined time after receiving the PRS, a sounding reference signal (SRS) to the BS — 1020

Receive, from the BS, a delay measurement corresponding to the PRS — 1030

1000

FIXED RECEPTION-TRANSMISSION (RX-TX) TIME DIFFERENCE FOR RTT BASED PROPAGATION DELAY COMPENSATION

CROSS-REFERENCE TO RELATED APPLICATIONS

The present application is a 35 U.S.C. 371 National Phase entry of Patent Cooperation Treaty (PCT) Application No. PCT/CN2020/119830, filed Oct. 6, 2020, which is hereby expressly incorporated herein by reference in its entirety.

TECHNICAL FIELD

The technology described below relates generally to wireless communication systems, and more particularly to determining and transmitting delay measurements, such as propagation delay, between a base station (BS) and a user equipment (UE).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

In a wireless communication network, delay in communications between wireless communication devices, such as a BS and a UE, may introduce uncertainty and latency to the network. Accordingly, in some cases, the BS and/or the UE may employ delay compensation techniques. These techniques may rely on measurements and/or calculations of delay between the BS and the UE, such as a propagation delay between the BS and the UE, as well as communication of these measurements between the wireless communication devices.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE) can include receiving, from a base station (BS), a positioning reference signal (PRS); transmitting, in response to and at a predetermined time after the receiving the PRS, a sounding reference signal (SRS) to the BS; and receiving, from the BS, a delay measurement corresponding to the PRS.

In an additional aspect of the disclosure, a method of wireless communication performed by a base station (BS) can include transmitting, to a user equipment (UE), a positioning reference signal (PRS); receiving, from the UE, a sounding reference signal (SRS); and transmitting, to the UE, a delay measurement via at least one of a medium access control-control element (MAC-CE) or a physical downlink control channel (PDCCH).

In an additional aspect of the disclosure, a user equipment (UE) can include a processor and a transceiver. The transceiver can be configured to receive, from a base station (BS), a positioning reference signal (PRS). The transceiver can be further configured to transmit, in response to and at a predetermined time after the receiving the PRS, a sounding reference signal (SRS) to the BS. The transceiver can be further configured to receive, from the BS, a delay measurement corresponding to the PRS.

In an additional aspect of the disclosure, a base station (BS) can include a processor and a transceiver. The transceiver can be configured to transmit, to a user equipment (UE), a positioning reference signal (PRS). The transceiver can be further configured to: receive, from the UE, a sounding reference signal (SRS). The transceiver can be further configured to transmit, to the UE, a delay measurement via at least one of a medium access control-control element (MAC-CE) or a physical downlink control channel (PDCCH).

In an additional aspect of the disclosure, a non-transitory computer-readable medium having program code recorded thereon, the program code can include code for causing a user equipment (UE) to receive, from a base station (BS), a positioning reference signal (PRS); code for causing the UE to transmit, in response to and at a predetermined time after the receiving the PRS, a sounding reference signal (SRS) to the BS; and code for causing the UE to receive, from the BS, a delay measurement corresponding to the PRS.

In an additional aspect of the disclosure, a non-transitory computer-readable medium having program code recorded thereon, the program code can include code for causing a base station (BS) to transmit, to a user equipment (UE), a positioning reference signal (PRS); code for causing the BS to receive, from the UE, a sounding reference signal (SRS); and code for causing the BS to transmit, to the UE, a delay measurement via at least one of a medium access control-control element (MAC-CE) or a physical downlink control channel (PDCCH).

In an additional aspect of the disclosure, a user equipment (UE) can include means for receiving, from a base station (BS), a positioning reference signal (PRS); means for transmitting, in response to and at a predetermined time after the receiving the PRS, a sounding reference signal (SRS) to the BS; and means for receiving, from the BS, a delay measurement corresponding to the PRS.

In an additional aspect of the disclosure, a base station (BS), can include means for transmitting, to a user equipment (UE), a positioning reference signal (PRS); means for receiving, from the UE, a sounding reference signal (SRS); and means for transmitting, to the UE, a delay measurement via at least one of a medium access control-control element (MAC-CE) or a physical downlink control channel (PDCCH).

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
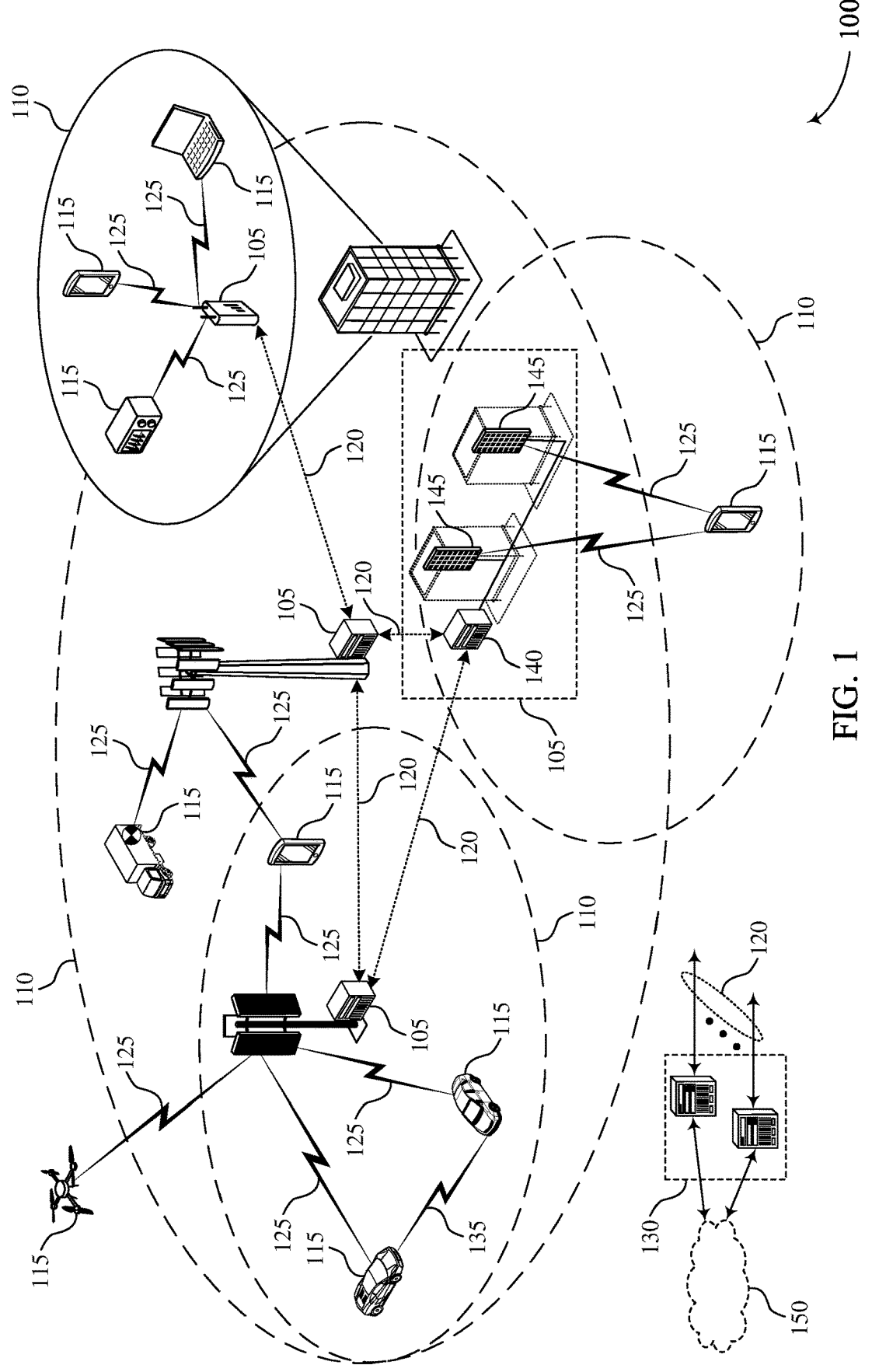
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, delay in communications between wireless communication devices, such as a BS and a UE, may introduce uncertainty and latency to the network. As an illustrative example, delay at the BS, the UE, or both, may result in uncertainty at other devices (e.g., UE, BS, or otherwise) connected to the UE and/or the BS. For example, the UE may be connected to an end station (e.g., a BS or another UE) that may provide timing information from a time sensitive networking (TSN) grandmaster clock to the UE. The UE may then relay this timing information to another device (e.g., a further UE (e.g., via a sidelink communication), a BS, or other device). Accordingly, a delay in communication involving the UE may result in a delayed transmission of the timing information. As such, the timing information received at the further device may be inaccurate. In some cases, however, a communication delay between communication devices (e.g., a UE and a BS) may be measured, and based on the measurement, the communication delay may be offset and/or an effect of the communication delay may be minimized in accordance with the present disclosure. For example, a UE may transmit a signal ahead of a scheduled time to compensate for the communication delay. In some instances, the UE utilizes a timing advance (TA) or other time compensation adjustment—that may be indicated and/or received from a BS—to adjust the timing of the UE's transmission(s). Additionally or alternatively, a propagation delay (e.g., a delay corresponding to a round-trip time (RTT) between the UE and the BS)—that may be determined based on a delay at the BS and/or a delay at the UE—may be used to account for a communication delay between the BS and the UE. In some instances, determining both the delay at the BS and the delay at the UE may involve the transmission and reception of multiple signals at each of the devices (e.g., the UE and the BS), which may be costly in terms of time and/or resources (e.g., network communication resources, device (e.g., UE and/or BS) power resources, and/or the like).

In some cases, for example, a BS may determine the propagation delay between the BS and a UE based on a BS reception-transmission (Rx-Tx) time difference (e.g., a delay between reception and transmission at the BS) and a UE reception-transmission (Rx-Tx) time difference (e.g., a delay between reception and transmission at the UE). Moreover, the BS may measure the BS Rx-Tx time difference at the BS, and the UE may measure the UE Rx-Tx time difference at the UE. Accordingly, to determine the propagation delay, the BS may wait to be able to measure the BS Rx-Tx time difference (e.g., to receive and transmit signals), for the UE to measure the UE Rx-Tx time difference, and to receive the UE Rx-Tx time difference from the UE.

As described herein the terms "reception-transmission time difference" or "Rx-Tx time difference," which may be used interchangeably, can refer to a time between reception of a first signal at a wireless communication device (e.g., a BS and/or a UE) and transmission of a second signal from the wireless communication device or vice versa. Further, the terms "propagation delay" and "round-trip time (RTT)," which may be used interchangeably, can refer to a total time between transmitting a signal from a first wireless communication device to a second wireless communication device (e.g., transmitting a signal from a UE to a BS or transmitting a signal from the BS to the UE) and receiving a response to the signal from the second wireless communication device at the first wireless communication device (e.g., receiving an acknowledgement of or response to the transmitted signal from the BS or receiving an acknowledgement of or response to the transmitted signal from the UE). In some instances, the terms "propagation delay" and "RTT" can refer to a sum of a BS Rx-Tx time difference and a UE Rx-Tx time difference, and as described herein, the term "downlink propagation delay" can refer to part of the propagation delay (e.g., the propagation delay associated with a downlink communication).

Aspects of the present disclosure relate to more efficient determination and/or transmission of delay measurements, such as propagation delay, between wireless communication devices. For instance, in some aspects, the UE Rx-Tx time difference may be fixed (e.g., preconfigured). As such, the BS may not need to rely on the UE transmitting the UE Rx-Tx time difference in order for to the BS to determine the propagation delay. To that end, the BS may use the fixed UE Rx-Tx time difference to determine the propagation delay. Thus, in some aspects, the UE may receive a positioning reference signal (PRS) from the BS that may initiate a procedure between the BS and UE to determine the propagation delay. In response, the UE may transmit a sounding reference signal (SRS) after the fixed UE Rx-Tx time difference (e.g., a predetermined time) from receipt of the PRS. Further, the UE may receive a delay measurement corresponding to the PRS from the BS. In some aspects, the delay measurement may correspond to the propagation delay. For example, the BS may measure the BS Rx-Tx time difference based on the transmission of the PRS and the receipt of the SRS from the UE at the BS. Based on the BS Rx-Tx time difference and the fixed UE Rx-Tx time difference, the BS may determine and transmit the propagation delay. In some aspects, the delay measurement may correspond to a difference between a current and a previous propagation delay, the BS Rx-Tx time difference, and/or a difference between the current BS Rx-Tx time difference and a previous BS Rx-Tx time difference, as described in greater detail below.

In some aspects, the UE may determine the predetermined time (e.g., the fixed UE Rx-Tx) based on a configuration setting of the UE. Additionally or alternatively, the UE may receive, from the BS, an indication of the predetermined time. Further, in some aspects, the UE may receive, from the BS, an indication of the predetermined time within a first MAC-CE message. In some aspects, the UE may then receive an adjusted predetermined time from the BS and may transmit a second SRS to the BS in response to and at the adjusted predetermined time after receiving an additional signal from the BS. In this way, the predetermined time may be dynamically configured.

In some aspects, the UE may determine the propagation delay between the UE and the BS based on a reception-transmission time difference at the BS (e.g., a BS Rx-Tx time difference). For instance, the UE may receive the BS Rx-Tx time difference as the delay measurement from the BS and may determine the propagation delay based on the received BS Rx-Tx time difference.

In some aspects, the UE may receive the delay measurement from the BS via a MAC-CE message. In some aspects, the UE may receive from the BS via a physical downlink control channel (PDCCH), downlink control information (DCI) including the delay measurement. Further, in some aspects, the DCI further includes an indication that the delay measurement is included in the DCI. For example, the indication may be based on a frequency resource indicator and a modulation and coding scheme indicator of the DCI. Additionally or alternatively, the indication may be based on a radio network temporary identifier (RNTI) indicating a presence of the delay measurement in the DCI. In such cases, for example, receiving the DCI may involve receiving, from the BS via the PDCCH, a first set of cyclic redundancy check (CRC) bits masked by the RNTI indicating the presence of the delay measurement in the DCI. Moreover, receiving the DCI may involve receiving, from the BS via the PDCCH, a second set of CRC bits masked by a C-RNTI.

Further, in some aspects, the BS may determine that a TA associated with the UE has changed from a first TA to a second TA, and the BS may transmit the PRS based on determining that the TA associated with the UE has changed. In some aspects, the BS may determine that a time has elapsed at a timer and may transmit the PRS based on determining the timer elapsing. In some aspects, the BS may determine that a distance between the UE and the BS has changed from a first distance to a second distance, and the BS may transmit the PRS based on determining that the distance between the UE and the BS has changed. In some aspects, the BS may transmit PRSs with respect to a periodicity. To that end, the BS may transmit the PRS based on the periodicity.

Aspects of the present disclosure can provide several benefits. For example, employing a fixed UE Rx-Tx (e.g., a predetermined time) may reduce the time and/or number of communication messages used to determine the propagation delay between a BS and a UE. In this way, techniques described herein may reduce network traffic. Moreover, using the fixed UE Tx-Tx may reduce processing power and/or power consumption used to determine the propagation delay. Further, by transmitting a delay message via a MAC-CE and/or the PDCCH, may reduce latency associated with the transmission of the delay measurement. For instance, the BS may transmit the delay measurement, in the presence or absence of DL data instead of waiting to transmit the delay measurement along with DL data. In this way, the techniques described herein may also improve reliability associated with the timing of the transmission of the delay measurement.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 may be dispersed throughout the wireless network 100, and each UE 115 may be stationary or mobile. UEs can take in a variety of forms and a range of form factors. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. The random access procedure (or RACH procedure) may be a single or multiple step process. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. Scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the BS 105 may serve multiple UEs 115 each having one or more transmit antenna elements and/or one or more receive antenna elements. The BS 105 may multiplex multiple UEs 115 for simultaneous communications over different spatial layers. To assist the BS 105 in determining UL channel characteristics, the BS 105 may configure each UE 115 to sound one or more transmit antenna ports of the respective UE 115. Sounding may refer to the transmission of an SRS via one or more antenna ports. The SRS may include a waveform sequence (e.g., predetermined) that are known to the BS 105 and the UE 115. For instance, the SRS may be Zadoff-Chu sequence or any suitable waveform sequence. In some instances, a transmit antenna port at a UE 115 may map to a physical transmit antenna element of the UE 115. In some other instances, a transmit antenna port at a UE 115 may be a virtual antenna port or a logical port created by the UE 115, for example, via precoding. Precoding may include applying different amplitude weights and/or different phased adjustments to signals output by the physical transmit antenna elements of the UE 115 to produce a signal directed towards a certain spatial direction. In some aspects, the network 100 may operate in a TDD mode. The BS 105 may also estimate DL channel characteristics from UL SRSs received from the UEs 115 based on TDD channel reciprocity.

In some aspects, the BS 105 may configure an SRS resource pool for sharing among a group of UEs 115. The SRS resource pool may include a plurality of SRS resources with different quantity of SRS ports. The BS 105 may configure parameters of the SRS semi-statically (e.g., via RRC messages). Additionally or alternatively, the BS 105 may dynamically trigger or activate a subset of the plurality of SRS resources for a connected UE 115 to transmit an SRS.

In some aspects, the BS 105 may participate, along with the UE 115, in a procedure to determine propagation delay (e.g., RTT) between the BS 105 and the UE 115. That is, for example, the BS 105 may determine a delay measurement, which may be used by the UE 115 to compensate for the propagation delay between the BS 105 and the UE 115. Mechanisms for determining and transmitting delay measurements corresponding to one or both of the BS 105 or the UE 115 are described in greater detail herein.

Figure 2:
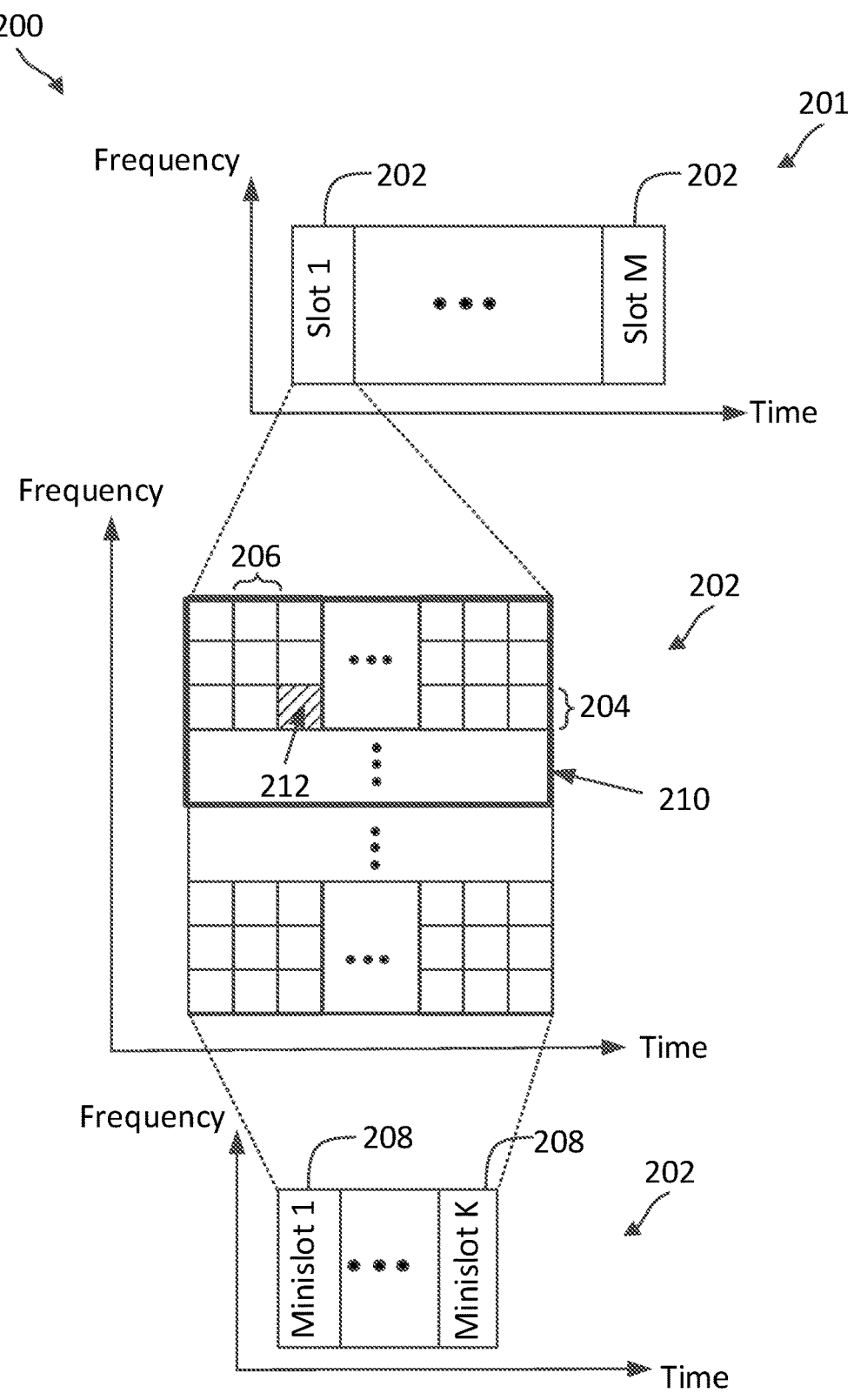
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications, for example, for the transmission of an SRS from the UEs to the BSs, for the transmission of a PRS from the BS to the UE, for the transmission of a delay measurement from the BS to the UE or vice versa, and/or the like. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the cyclic prefix (CP) mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N-1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204). In an example, a BS (e.g., BS 105 in FIG. 1) may schedule a UE (e.g., UE 115 in FIG. 1) for UL and/or DL communications at a time-granularity of slots 202 or mini-slots 208.

Figure 3:
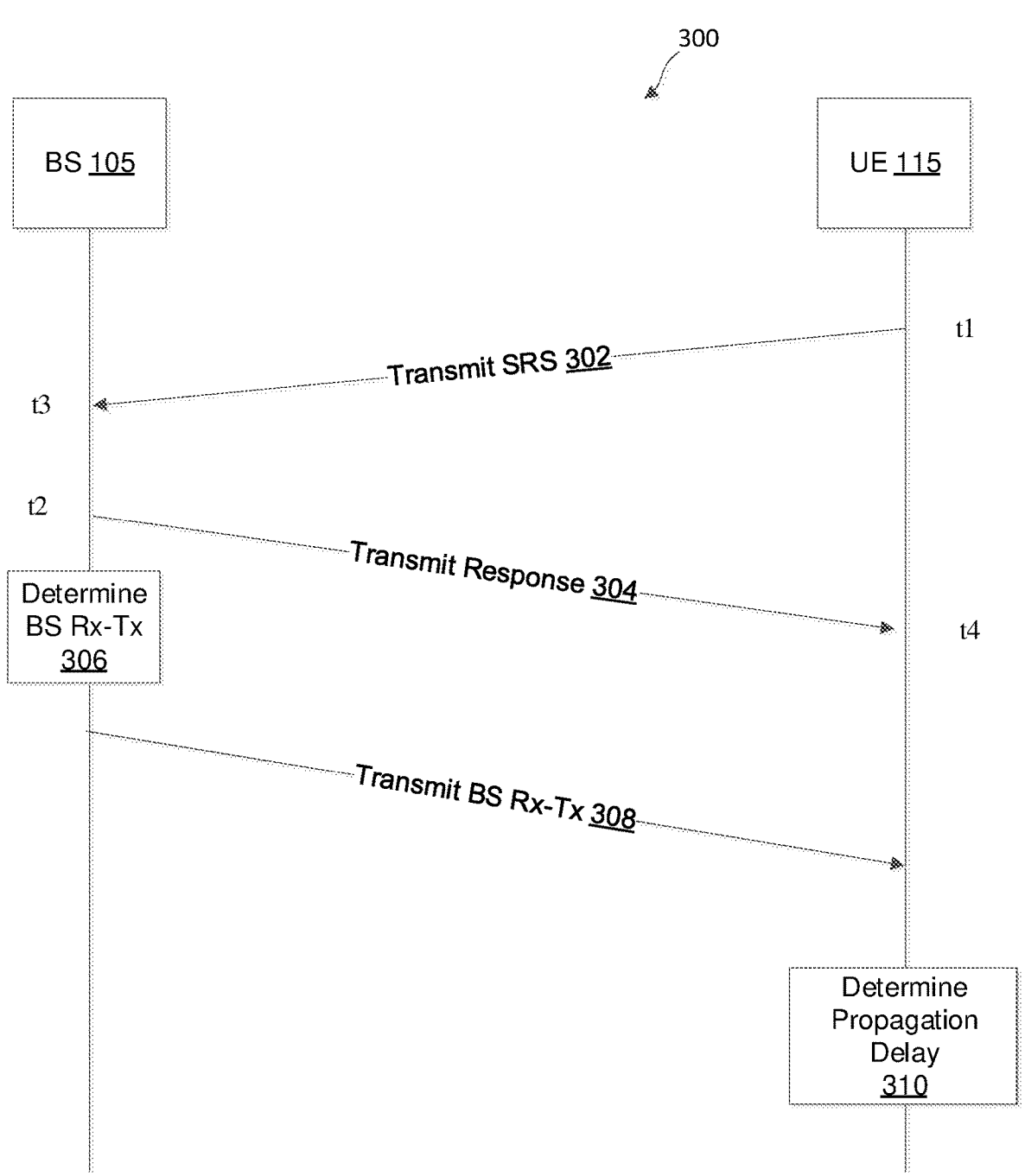
FIG. 3 illustrates a signaling diagram of a method for determining, at a UE, a propagation delay between the UE and a BS according to some aspects of the present disclosure.

Turning now to FIG. 3, a signaling diagram of method 300 for determining, at a UE, a propagation delay between a BS and the UE (e.g., a round trip time (RTT)) is illustrated, according to some aspects of the present disclosure. The method 300 may be employed by a BS, such as BS 105, and a UE, such as UE 115. Further, the method 300 can be used in conjunction with the radio frame structure 200 of FIG. 2. As illustrated, the method 300 includes a number of enumerated actions, but embodiments of the method 300 may include additional actions before, after, and in between the enumerated actions. In some embodiments, one or more of the enumerated actions may be omitted or performed in a different order.

At action 302, the UE 115 may transmit a sounding reference signal (SRS) to the BS 105. As described herein, the UE 115 may transmit the SRS within a subframe (e.g., slot 202), such as a UL subframe in a UL frequency band (e.g., one or more a number of subcarriers 204). Moreover, in some aspects, the UE 115 may transmit the SRS within a pre-defined region (e.g., one or more symbols 206, one or more mini-slots 208, one or more RBs 210, one or more REs 212, and/or the like) of the UL subframe, such as a region for transmissions of reference signals. For instance, the UE 115 may transmit the SRS using SRS resources configured by the BS 103. Thus, the UE 115 may transmit the SRS using an RRC message. In some aspects, the UE 115 may transmit the SRS to the BS 105 in response to receiving a positioning reference signal (PRS) from the BS. Further, as described herein, the transmission of the SRS may correspond to a time, t1.

The BS 105 may receive the SRS from the UE 115 at a time, t3, following the transmission of the SRS (e.g., following t1). In some aspects, the difference between t3 and t1 may vary depending on one or more factors, such as a transmission power level used to transmit the SRS at the UE 115, a physical distance between the BS 105 and the UE 115, one or more channel conditions, and/or the like. Moreover, as described herein, t3 can correspond to the time the BS 105 receives the SRS.

At action 304, the BS 105 may transmit a response (e.g., a response to the SRS) to the UE 115. In particular, the BS 105 may transmit the response within a DL subframe (e.g., slot 202). In some aspects, the BS 105 may minimize the time between receiving the SRS and transmitting the response. Accordingly, the BS 105 may transmit the response within a DL subframe that is closest in time to the UL subframe corresponding to the SRS (e.g., closest in time to t1 and/or t3). As described herein, the transmission of the response by the BS 105 may correspond to a time, t2. Further, the UE 115 may receive the response from the BS 105 at time t4, as illustrated. As described herein, the reception of a signal, such as the response, from the BS 105 at the UE 115 can correspond to t4.

While the BS 105 may transmit the response within the DL subframe closest in time to the UL subframe corresponding to the SRS, a delay between t3 and t2 may exist, as illustrated. In particular, a BS Rx-Tx time difference may be defined by the difference between t2 and t3, or, more generally, a time between receiving a first signal at the BS and transmitting a second signal from the BS or vice versa.

At action 306, the BS 105 may determine the BS Rx-Tx time difference (BS Rx-Tx). Accordingly, the BS 105 may determine the difference between t2 and t3. In some aspects, for example, the BS 105 may measure the time difference between t2 and t3. For instance, the BS 105 may use counter, a timer, or another suitable measurement technique to determine the difference between t2 and t3. Moreover, the BS 105 may measure the difference directly or may determine the respective values of t2 and t3 and calculate the difference using these values.

At action 308, the BS 105 may transmit the determined BS Rx-Tx time difference to the UE 115. As similarly described above with respect to action 304, the BS 105 may transmit the determined BS Rx-Tx time difference within a DL subframe. To that end, the BS 105 may transmit the determined BS Rx-Tx transmission time difference via an RRC message.

In some aspects, the BS 105 may determine a difference between the BS Rx-Tx time difference determined at action 306 (e.g., a current BS Rx-Tx time difference) and a previous value of the BS Rx-Tx time difference (e.g., a previous BS Rx-Tx time difference). For example, the previous BS Rx-Tx time difference may correspond to a BS Rx-Tx measured and/or calculated in a previous iteration of the method 300. Thus, the BS 105 may retrieve the previous BS Rx-Tx time difference from memory and/or storage to determine the difference between the current and the previous BS Rx-Tx time difference, for example. Further, after determining the difference between the previous and the current Rx-Tx time difference, the BS 105 may transmit the difference between the previous and the current Rx-Tx time difference to the UE 115 (e.g., at action 308). Accordingly, while the BS 105 is described herein as transmitting the BS Rx-Tx time difference at action 308, it may be appreciated that the BS 105 may additionally or alternatively transmit a difference between the previous and the current Rx-Tx time difference at action 308.

At action 310, the UE 115 may determine a propagation delay between the BS 105 and the UE 115 (e.g., a downlink propagation delay). In some instances, the UE 115 may determine the propagation delay based on the received BS Rx-Tx time difference (e.g., action 308) and a UE Rx-Tx time difference, or a round-trip time (RTT) between the BS 105 and the UE 115. The UE Rx-Tx time difference may correspond to a difference between t4, the time of the reception of the response from the BS 105, and t1, the time of the transmission of the SRS. Accordingly, the UE 115 may transmit the propagation delay (e.g., the RTT), denoted as RTT, as shown below:

$$RTT=((t3-t2)+(t4-t1)) \qquad (1)$$

where (t3−t2) represents the BS Rx-Tx time difference, and (t4−t1) represents the UE Rx-Tx time difference.

In some aspects, the UE 115 may receive a first signal used to determine a propagation delay, such as a PRS, from the BS 105 before transmitting a second signal used to determine a propagation delay, such as the SRS, to the BS 105. Similarly, the BS 105 may transmit the first signal to the UE 115 before receiving the second signal (e.g., the SRS) from the UE 115. As such, while t1 is illustrated and described herein as occurring before t4 and t3 is illustrated and described as occurring before t2, aspects are not limited thereto. Instead, it may be appreciated that the t4 may occur before t1 and t2 may occur before t3. To that end, the BS Rx-Tx time difference and the UE BS Rx-Tx time difference may be determined based on an absolute value of a difference between t3 and t2 and between t1 and t4, respectively. Additionally or alternatively, the UE 115 may determine the propagation delay denoted as RTT, as shown below:

$$RTT=((t2-t3)+(t1-t4)) \qquad (2)$$

where (t2−t3) represents the BS Rx-Tx time difference, and (t1−t4) represents the UE Rx-Tx time difference.

In some aspects, the UE 115 may determine the UE Rx-Tx time difference before determining the propagation delay. For instance, the UE 115 may determine the UE Rx-Tx time difference by measuring the difference between t4 and t1 and/or by determining the values of t4 and t1 to calculate the difference based on these values, as similarly described above with reference to the BS Rx-Tx time difference. In such cases, the UE 115 may add the received value of the BS Rx-Tx time difference and the determined UE Rx-Tx time difference to determine the propagation delay, in accordance with equation 1 and/or equation 2. In other embodiments, the UE 115 may determine the UE Rx-Tx time difference and/or the values of t4 and t1 at the time of the calculation of the propagation delay. Moreover, while the BS 105 is illustrated as transmitting the BS Rx-Tx time difference (e.g., at action 308), aspects are not limited thereto. In some aspects, for example, the BS 105 may transmit the respective values of t3 and t2, and the UE 115 may use the respective values of t3 and t2 to determine the propagation delay.

As described above, the BS 105 may transmit the difference between the previous and the current BS Rx-Tx time difference to the UE 115 (e.g., at action 308). In such cases, the UE 115 may determine the propagation delay based on the UE Rx-Tx time difference and the difference between previous and current BS Rx-Tx time difference. For instance, the UE 115 may determine the current BS Rx-Tx time difference based on the difference between the previous and the current BS Rx-Tx time difference and may then determine the propagation delay based on the current BS Rx-Tx and the UE Rx-Tx, as described below with reference to equation 4.

Further, in some aspects, determining the propagation delay with the UE 115 (e.g., action 310) may involve the use of power and resources (e.g., computational resources) at the UE 115. Thus, determining the propagation delay with the BS 105 may reduce power consumption and/or resource utilization at the UE 115, as described in greater detail below.

Figure 4:
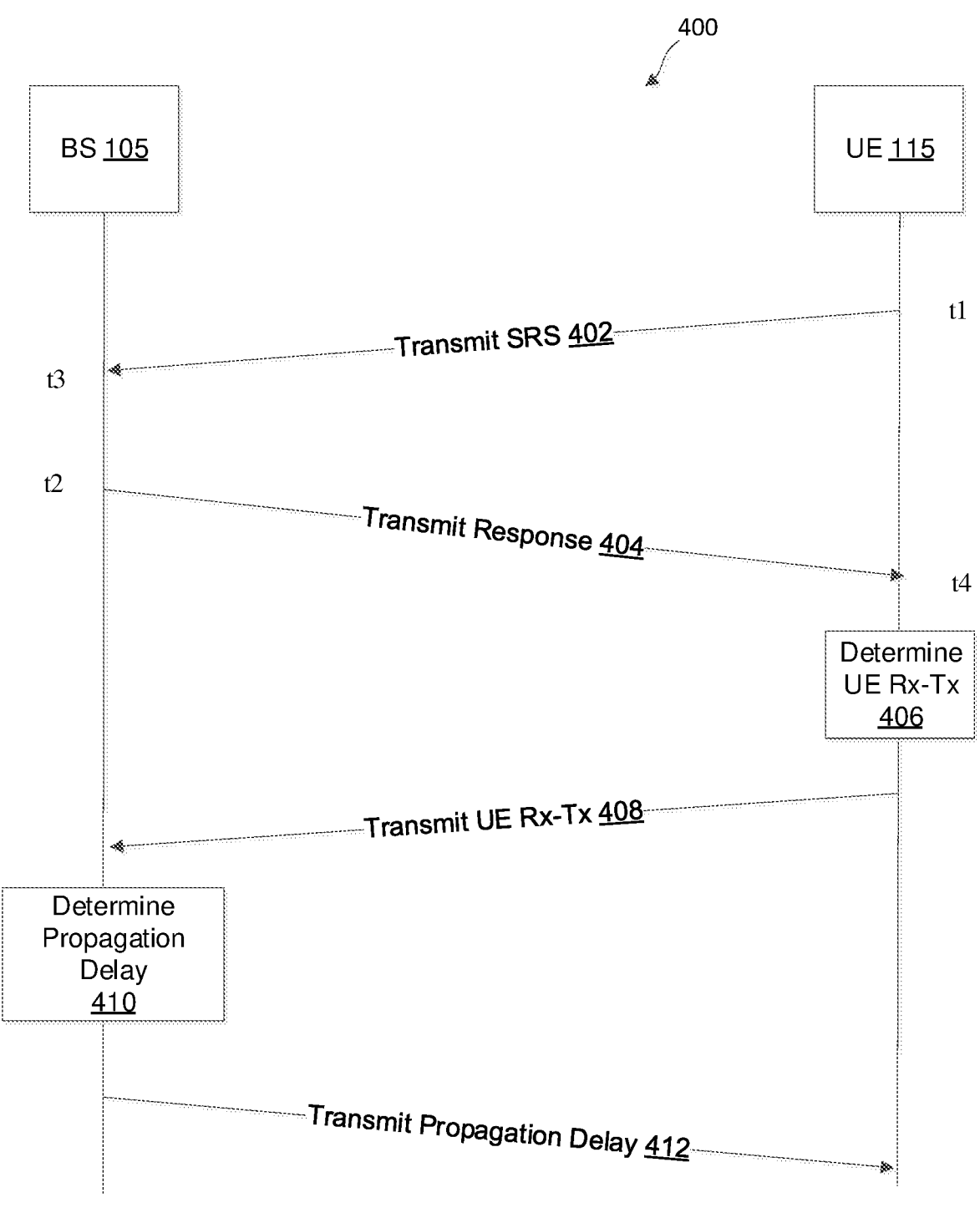
FIG. 4 illustrates a signaling diagram of a method for determining, at a BS, a propagation delay between a UE and the BS according to some aspects of the present disclosure.

FIG. 4 illustrates a signaling diagram of method 400 for determining, at a BS, a propagation delay between the BS and a UE (e.g., downlink propagation delay), according to some aspects of the present disclosure. The method 400 may be employed by a BS, such as BS 105, and a UE, such as UE 115. Further, the method 400 can be used in conjunction with the radio frame structure 200 of FIG. 2. As illustrated, the method 400 includes a number of enumerated actions, but embodiments of the method 400 may include additional actions before, after, and in between the enumerated actions. In some embodiments, one or more of the enumerated actions may be omitted or performed in a different order.

Generally speaking, actions 402 and 404 of method 400 are similar to actions 302 and 304 of method 300, respectively. In particular, at action 402 the UE 115 may transmit an SRS to the BS 105, and at action 404, the BS 105 may transmit a response to the UE 115, as described above with reference to actions 302 and 304, respectively. Accordingly, for sake of brevity, details of those steps will not be repeated here.

At action 406, the UE 115 may determine the UE Rx-Tx time difference (UE Rx-Tx). Accordingly, the UE 115 may determine the difference between t4 and t1. In some aspects, for example, the UE 115 may measure the time difference between t4 and t1. For instance, the UE 115 may use counter, a timer, or another suitable measurement technique to determine the difference between t4 and t1. Moreover, the UE 115 may measure the difference directly or may determine the respective values of t4 and t1 and calculate the difference using these values.

At action 408, the UE 115 may transmit the determined UE Rx-Tx time difference to the BS 105. The UE 115 may transmit the determined UE Rx-Tx time difference within a UL subframe, as similarly described above with respect to transmission of the SRS.

At action 410, the BS 105 may determine a propagation delay between the BS 105 and the UE 115 (e.g., a downlink propagation delay). As described above, the downlink propagation delay maybe determined based on equation 1 and/or equation 2. Accordingly, the BS 105 may determine the downlink propagation delay based on the received UE Rx-Tx time difference (e.g., action 408) and the BS Rx-Tx time difference. Moreover, BS 105 may determine the BS Rx-Tx time difference before determining the propagation delay or at the time of the calculation of the propagation delay. Further, while the UE 115 is illustrated as transmitting the UE Rx-Tx time difference (e.g., at action 408), aspects are not limited thereto. In some aspects, for example, the UE 115 may transmit the respective values of t1 and t4, and the BS 105 may use the respective values of t1 and t4 to determine the propagation delay.

At action 412, the BS 105 may transmit the determined propagation delay to the UE 115. For instance, the BS 105 may transmit the propagation delay to the UE 115 via a DL subframe. To that end, the BS 105 may transmit the propagation delay to the UE 115 via an RRC message. In some aspects, the UE 115 may subsequently use the received propagation delay to reduce uncertainty in the network (e.g., to compensate for the propagation delay). For instance, the UE 115 may, based on the propagation delay, advance transmission of a signal, such as a signal associated with timing information, to improve synchronization with a TSN grandmaster clock within the network.

In some aspects, the BS 105 may determine a difference between the propagation delay determined at action 410 (e.g., a current propagation delay) and a previous propagation delay. For example, the previous propagation delay may correspond to a propagation delay measured and/or calculated in a previous iteration of the method 400. Thus, the BS 105 may retrieve the previous propagation delay from memory and/or storage to determine the difference between the current and the previous propagation delay, for example. Further, after determining the difference between the previous and the current propagation delay, the BS 105 may transmit the difference between the previous and the current propagation delay to the UE 115 (e.g., at action 412). Accordingly, while the BS 105 is described herein as transmitting the propagation delay at action 412, it may be appreciated that the BS 105 may additionally or alternatively transmit a difference between the previous and the current propagation delay at action 412. In such cases, the UE 115 may determine the propagation delay based on the difference between the previous and current propagation delay, as described below with reference to equation 3.

As discussed above, determining the propagation delay with the BS 105 (e.g., at action 410) may reduce power consumption and/or resource utilization at the UE 115. For instance, while the BS 105 determines the propagation delay (action 410), the UE 115 may perform other operations. Moreover, the UE 115 may conserve the power used to determine the propagation delay (e.g., calculate the propagation delay according to equation 1 and/or equation 2), which may improve battery life at the UE 115. On the other hand, in comparison with the method 300, the method 400 involves a greater number of signal transmissions between the UE 115 and the BS 105. To that end, determining the propagation delay using the BS 105 (e.g., according to method 400) may increase the total time and/or communication resources (e.g., time-frequency resources) involved in determining the propagation delay with respect to determining the propagation delay using the UE 115. Thus, in some aspects, the BS 105 and/or the UE 115 may be configured to selectively perform the method 300 or the method 400 to minimize use of communication resources in the network, minimize power consumption and/or resource utilization at the UE 115, and/or the like.

Moreover, in some aspects, the total time (e.g., latency) and/or the communication resources used to determine the propagation delay the using the BS 105 may be reduced in comparison with latency and resource usage associated the illustrated method 400. For instance, in some aspects, the UE Rx-Tx time difference may be fixed (e.g., predetermined and/or preconfigured), as described in greater detail below.

Figure 5:
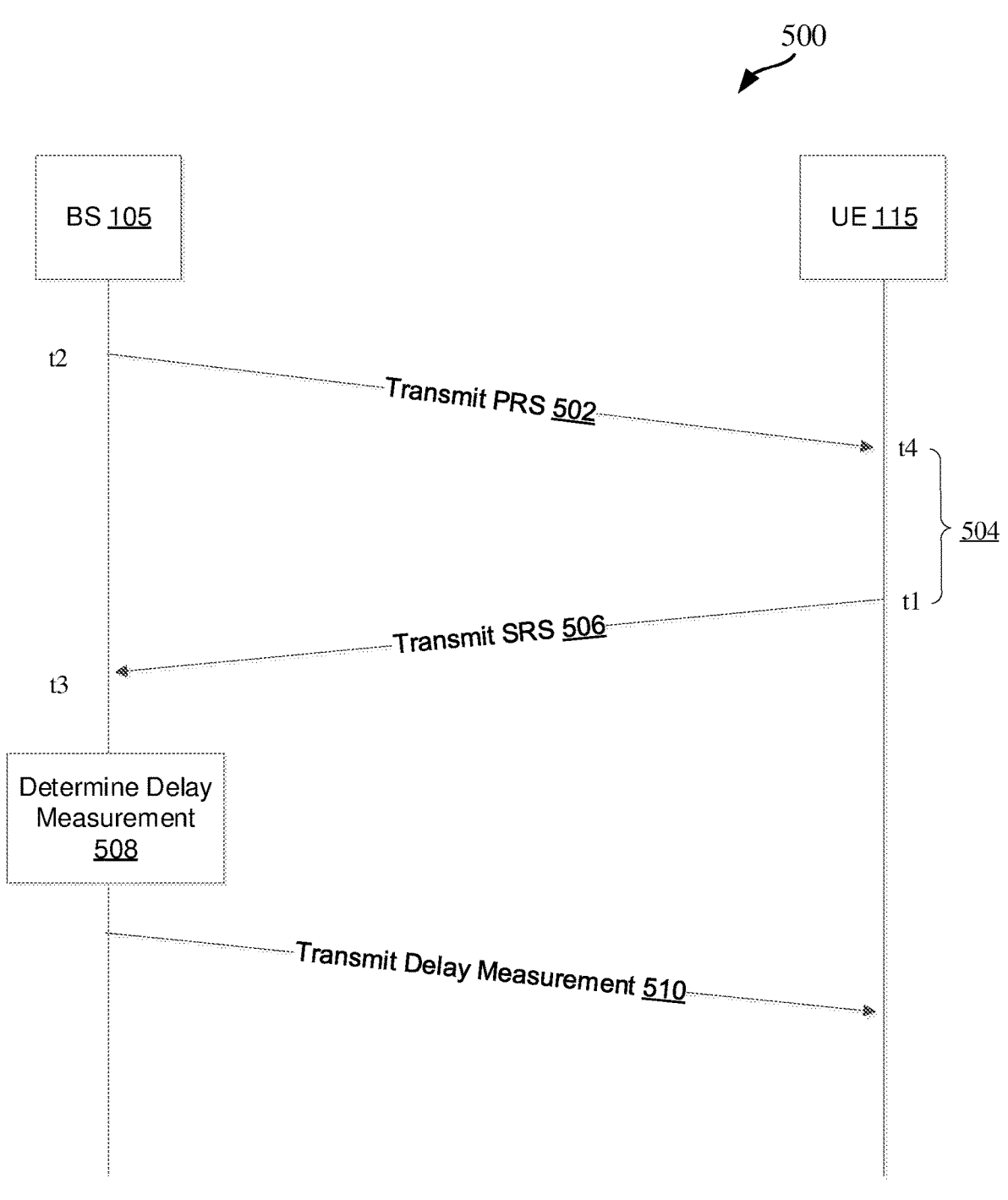
FIG. 5 illustrates a signaling diagram of a method for determining, at a BS, a propagation delay between the UE and the BS based on a fixed UE reception-transmission (Rx-Tx) time difference according to some aspects of the present disclosure.

FIG. 5 illustrates a signaling diagram of method 500 for determining, at a BS, a propagation delay between the BS and a UE (e.g., downlink propagation delay) based on a fixed (e.g., predetermined) UE Rx-Tx time difference, according to some aspects of the present disclosure. The method 500 may be employed by a BS, such as BS 105, and a UE, such as UE 115. Further, the method 500 can be used in conjunction with the radio frame structure 200 of FIG. 2. As illustrated, the method 500 includes a number of enumerated actions, but embodiments of the method 500 may include additional actions before, after, and in between the enumerated actions. In some embodiments, one or more of the enumerated actions may be omitted or performed in a different order.

At action 502, the BS 105 may initiate the method 500 by transmitting a positioning reference signal (PRS) to the UE 115. The BS 105 may transmit the PRS within a DL subframe, for example. Moreover, the BS 105 may transmit the PRS within a designated portion of the DL subframe, with an indication of the presence of the PRS within the DL subframe, and/or the BS 105 may transmit a predetermined (e.g., preconfigured) pattern as the PRS so that the UE 115 can identify and/or detect the PRS. In some aspects, the BS 105 may use the PRS to determine the propagation delay between the UE 115 and the BS 105. Further, the BS 105 may use the PRS to determine the location of the UE 115 relative to the BS 105. For instance, the BS 105 may determine the location of the UE 115 based on a time of arrival (TOA) of the PRS at the UE 115, which the UE 115 may transmit to the BS 105.

As illustrated, the transmission of the PRS corresponds to the time t2, and the reception of the PRS at the UE 115 corresponds to the time t4. To that end, as described above, t2 corresponds to a time the BS 105 transmits a signal, t4 corresponds to a time the UE 115 receives a signal, and the propagation delay may be determined based on t2 and t4

(e.g., based on the corresponding BS Rx-Tx time difference and the UE Rx-Tx time difference, respectively).

In some aspects, the BS 105 may initiate and/or repeat the method 500 (e.g., by transmitting the PRS) with a regular periodicity. For instance, the BS 105 may be configured to transmit the PRS every millisecond, second, minute, hour, and/or the like. Additionally or alternatively, the BS 105 may transmit the PRS with a periodicity corresponding to a certain number of slots (e.g., slot 202), such as every slot, every other slot, every 10 slots, and/or the like. In some cases, the propagation delay between the BS 105 and the UE 115 may not vary significantly over these time period between PRS transmissions. For instance, if the UE 115 remains stationary and/or within the same position relative to the BS 105 over the time period, the propagation delay may remain relatively constant. Further, repeatedly performing the method 500 may be costly in terms of power and resource consumption (e.g., communication resources, computational resources, time, and/or the like) with respect to the BS 105 and/or the UE 115. Thus, in some aspects, the BS 105 may be triggered to initiate the method 500 based on one or more events. For instance, the BS 105 may initiate the method 500 in response to a change in the timing advance (TA) associated with the UE 115. Further, the BS 105 may initiate the method 500 (e.g., transmit the PRS) in response to a mobility event. In particular, the BS 105 may initiate the method 500 in response to determining the position and/or location of the UE 115 has changed. In some aspects, the BS 105 may initiate the method 500 in response to a timer elapsing. More specifically, the BS 105 may initiate the method 500 in response to an event, such as the change in the TA or the mobility event, or the timer elapsing based on whichever occurs first. Moreover, the BS 105 may reset the timer after transmitting the PRS. As such, the BS 105 may transmit the PRS in response to an event and/or at least as frequently as the timer indicates.

As further illustrated, the time (e.g., delay) between t1 and t4 at the UE 115 is fixed. That is, for example, the time between the UE 115 receiving the PRS (e.g., at action 502) and transmitting a signal is fixed according to a fixed UE Rx-Tx time difference 504 (e.g., a predetermined time). In some aspects, the UE 115 may be configured with the fixed UE Rx-Tx time difference 504 during manufacture and/or initialization of the UE 115. For instance, the fixed UE Rx-Tx time difference 504 may correspond to a preprogrammed setting of the UE 115. Additionally or alternatively, the BS 105 may preconfigure the UE 115 with the fixed UE Rx-Tx time difference 504. For instance, the BS 105 may broadcast the fixed UE Rx-Tx time difference 504 (e.g., within the MIB, RMSI, and/or OSI) to the UE 115 and/or may transmit a RRC message including the fixed UE Rx-Tx time difference 504 to the UE 115. Moreover, in some aspects, the BS 105 may dynamically configure the value of the fixed UE Rx-Tx time difference 504. In particular, the BS 105 may transmit the fixed UE Rx-Tx time difference 504 and/or an indication of the fixed UE Rx-Tx time difference 504 to the UE 115 via a medium access control-control element (MAC-CE) message. Accordingly, the BS 105 may transmit a first MAC-CE, which may indicate a first fixed UE Rx-Tx time difference 504, and subsequently, the BS 105 may transmit a different, second MAC-CE, which may indicate a different, second fixed UE Rx-Tx time difference 504 to the UE 115. In this way, the BS 105 may adjust the fixed UE Rx-Tx time difference 504 to achieve certain network conditions (e.g., resource utilization, latency, and/or the like).

At action 506, the UE 115 may transmit an SRS to the BS 105. More specifically, the UE 115 may transmit the SRS in response to receiving the PRS from the BS 105. Further, the transmission of the SRS corresponds to the time the fixed UE Rx-Tx time difference 504 elapses (e.g., time t1), as illustrated. Thus, the UE 115 may transmit the SRS in response to the PRS and at a predetermined time (e.g., the fixed UE Rx-Tx time difference 504) following receiving the PRS. Moreover, as described herein, the UE 115 may transmit the SRS within a UL subframe.

As illustrated, the transmission of the SRS corresponds to the time t1, and the reception of the SRS at the BS 105 corresponds to the time t3. To that end, as described above, t3 corresponds to a time the BS 105 receives a signal, t1 corresponds to a time the UE 115 transmits a signal, and the propagation delay may be determined based on t3 and t1 (e.g., based on the corresponding BS Rx-Tx time difference and the UE Rx-Tx time difference, respectively).

At action 508, the BS 105 may determine a delay measurement. In some aspects, the delay measurement may correspond to the propagation delay between the BS 105 and the UE 115. In such cases, the BS 105 may determine the delay measurement based on the fixed UE Rx-Tx time difference 504 and a BS Rx-Tx time difference, which may correspond to the time between the transmission of the PRS (t2) and the reception of the SRS (t3). Thus, the BS 105 may determine (e.g., measure) the BS Rx-Tx time difference or may use the values of t2 and t3 to determine the delay measurement. Moreover, the BS 105 may be configured with the value of the fixed UE Rx-Tx time difference 504 or may receive the fixed UE Rx-Tx time difference 504 from the UE 115 or another wireless communication device (e.g., another BS 105). More specifically, in some aspects, the BS 105 may receive the fixed UE Rx-Tx time difference 504 before initializing the method 500 (e.g., transmitting the PRS 502). For instance, the BS 105 may receive the fixed UE Rx-Tx time difference 504 upon initialization of communication with the UE 115 and/or may transmit a request to the UE 115 for the fixed UE Rx-Tx time difference 504. In any case, the BS 105 may determine the propagation delay as the delay measurement using the equation 1 and/or equation 2 shown above.

In some aspects, the delay measurement may correspond to the BS Rx-Tx time difference. In such cases, the BS 105 may determine the delay measurement as described above with reference to action 306 of FIG. 3. That is, for example, the BS 105 may measure the difference between the times t2 and t3 and/or may determine the values of t2 and t3 and calculate the difference based on these values.

Further, in some aspects, the delay measurement may correspond to a difference between a previous propagation delay measurement and a current propagation delay measurement. In such cases, the BS 105 may determine the current propagation delay measurement based on the fixed UE Rx-Tx time difference and the BS Rx-Tx time difference corresponding to the difference between the illustrated t2 and t3, which may be measured at the BS 105. The BS 105 may also retrieve and/or determine a previous propagation delay measurement, which may correspond to a delay between the BS 105 and the UE 115 at an earlier period of time. Thus, the BS 105 may determine the change in the value of the propagation delay between a first and second time, for example. Moreover, the change may result from a change in network or channel conditions, a change in the location or position of the UE 115 with respect to the BS 105, and/or the like.

Similarly, in some aspects, the delay measurement may correspond to a difference between a previous BS Rx-Tx time difference and a current BS Rx-Tx time difference. For example, the BS 105 may determine the current BS Rx-Tx time difference based on the difference between the illustrated t3 and t2. The BS 105 may also retrieve and/or determine a previous BS Rx-Tx time difference, which may correspond to a BS Rx-Tx time difference at an earlier period of time. Thus, the BS 105 may determine the change in the value of the BS Rx-Tx time difference between a first and second time, for example.

At action 510, the BS 105 may transmit the determined delay measurement to the UE 115. In cases where the delay measurement corresponds to the propagation delay, the UE 115 may use the received delay measurement to reduce uncertainty in the network (e.g., network 100). For instance, the UE 115 may, based on the delay measurement (e.g., the propagation delay), advance transmission of a signal, such as a signal associated with timing information, to improve synchronization at the UE 115 or another wireless communication device (e.g., another UE) with a TSN grandmaster clock within the network.

In cases where the delay measurement corresponds to the BS Rx-Tx time difference, the UE 115 may, after receiving the delay measurement, determine the propagation delay. For instance, the UE 115 may determine the propagation delay based on the fixed UE Rx-Tx time difference 504 and the received delay measurement (e.g., the received BS Rx-Tx time difference), in accordance with equation 1 and/or equation 2.

In cases where the delay measurement corresponds to the difference between the previous and the current propagation delay, the UE 115, may, after receiving the delay measurement, determine the current propagation delay itself. For instance, the UE 115 may determine the current propagation delay as shown below:

$$N_{RTT,new} = N_{RTT,old} + \left( RTT - \frac{RTT_{length}}{2} \right) \tag{3}$$

where $N_{RTT,new}$, when multiplied by a granularity (e.g., a clock period (Tc)), represents the current propagation delay, $N_{RTT,old}$ when multiplied by the granularity, represents the previous propagation delay, and $$\left( RTT - \frac{RTT_{length}}{2} \right)$$

represents the difference between the previous and the current propagation delay. As an illustrative example, the granularity may correspond to the period of a clock (Tc) (e.g., the grandmaster clock) in the network and/or at the BS 105. Additionally or alternatively, the granularity may correspond to 2 Tc or any other suitable value of granularity. Further, the BS 105 may provide an indication of the granularity to the UE 115. In some aspects, the UE 115 may retrieve $N_{RTT,old}$ (corresponding to the previous propagation delay), which may be stored at the UE 115 (e.g., within memory or storage at the UE 115). Accordingly, by receiving the difference between the previous and the current propagation delay, the UE 115 may determine the current propagation delay.

In cases where the delay measurement corresponds to the difference between the previous and the current BS Rx-Tx time difference, the UE 115 may, after receiving the delay measurement, determine the current BS Rx-Tx time difference. For instance, the UE 115 may determine the current BS Rx-Tx time difference, as shown below:

$$N_{gNB_{Rx-Tx},new} = N_{gNB_{Rx-Tx},old} + \left( gNB_{Rx-Tx} - \frac{gNB_{Rx-Tx_{length}}}{2} \right) \tag{4}$$

where $N_{gNB_{Rx-Tx},new}$, when multiplied by a granularity (e.g., a clock period (Tc)), represents the current BS Rx-Tx time difference, $N_{gNB_{Rx-Tx},old}$, when multiplied by the granularity, represents the previous BS Rx-Tx time difference, and $$\left( gNB_{Rx-Tx} - \frac{gNB_{Rx-Tx_{length}}}{2} \right)$$

represents the difference between the previous and the current BS Rx-Tx time difference. As described above, the granularity may correspond to the period of a clock (Tc) (e.g., the grandmaster clock) in the network and/or at the BS 105, twice the period of the clock (2 Tc), and/or the like. Further, the BS 105 may provide an indication of the granularity to the UE 115. In some aspects, the UE 115 may retrieve $N_{gNB_{Rx-Tx},old}$ (corresponding to the previous BS Rx-Tx time difference), which may be stored at the UE 115 (e.g., within memory or storage at the UE 115). Accordingly, by receiving the difference between the previous and the current BS Rx-Tx time difference, the UE 115 may determine the current BS Rx-Tx time difference. Moreover, based on the current BS Rx-Tx time difference, the UE 115 may then determine the propagation delay.

While the variations of delay measurements are described above with reference to the method 500, aspects are not limited thereto. For instance, in some aspects, the method 300 of FIG. 3 may involve determination and transmission of a delay measurement corresponding to the BS Rx-Tx time difference, as illustrated, and/or to a difference between a current and a previous BS Rx-Tx time difference. As an illustrative example, at action 308, the BS 105 may transmit the difference between a current and a previous BS Rx-Tx time difference. In such cases, the UE 115 may determine the propagation delay (e.g., at action 310) based on the difference between the current and the previous BS Rx-Tx time difference. For instance, the UE 115 may determine the current BS Rx-Tx time difference and subsequently determine the propagation delay based on the current BS Rx-Tx and the UE Rx-Tx. Further, in some aspects, the method of 400 of FIG. 4 may involve the determination and transmission of a delay measurement corresponding to the propagation delay (as illustrated), the BS Rx-Tx time difference, the difference between the previous and the current propagation delay, and/or the difference between the current and previous BS Rx-Tx. More specifically, the actions 410 and 412 may generally correspond to the actions 508 and 510 of FIG. 5, respectively. That is, for example, at action 410, the BS 105 may determine a delay measurement, which may involve determining the propagation delay, as illustrated, or another delay measurement, as listed above. At action 412, the BS 105 may transmit the determined delay measurement to the UE 115.

Further, as described above, the BS 105 may transmit the delay measurement (e.g., at action 510) to the UE 115 via a DL subframe and/or RRC messaging. However, in some cases, if the BS 105 has no other DL data to be transmitted, the BS 105 may wait to transmit the delay measurement via the DL subframe and/or RRC messaging until the BS 105 can transmit the delay measurement along with other DL data. Accordingly, in some aspects, the BS 105 may transmit the delay measurement to the UE 115 via a MAC-CE and/or the PDCCH (e.g., via a low layer signal), which may reduce latency associated with the transmission of the delay measurement. For instance, the BS 105 may transmit the delay measurement, which may correspond to the propagation delay, the BS Rx-Tx time difference, the difference between the previous and the current propagation delay, the difference between the current and previous BS Rx-Tx, using a MAC-CE message. In such cases, the UE 115 may, after receiving the MAC-CE message, determine the propagation value based on the delay measurement, as described above. Further, in some aspects, the BS 105 may transmit, via the MAC-CE, a delay measurement corresponding to the propagation delay using up to 21 bits. In this way, the BS 105 may ensure the delay measurement, which may also be used for positioning between the BS 105 and the UE 115, is transmitted with the same granularity and/or accuracy as needed for positioning.

Moreover, while the actions 308 of FIG. 3 and 412 of FIG. 4 are described herein as involving a transmission using a DL subframe, embodiments are not limited thereto. To that end, the transmission of a delay measurement, such as the illustrated transmission of a BS Rx-Tx time difference (action 308), the illustrated transmission of a propagation delay (action 412), or any other suitable delay measurement described herein may be performed via a MAC-CE and/or the PDCCH (e.g., via low layer signal).

Figures 6, 7:
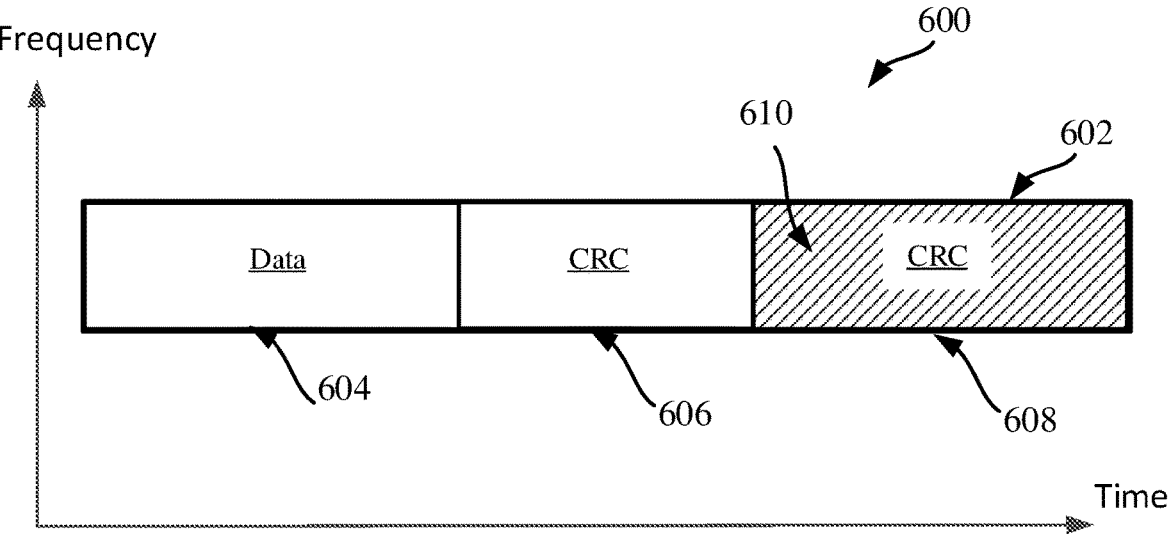
FIG. 6 is a block diagram of a physical downlink control channel (PDCCH) communication for transmission of downlink control information (DCI) according to some aspects of the present disclosure.
FIG. 7 is a block diagram of a physical downlink control channel (PDCCH) communication for transmission of downlink control information (DCI) according to some aspects of the present disclosure.

Turning now to FIGS. 6 and 7, a PDCCH 600 for transmission of a DCI 602 is illustrated, according to some aspects of the present disclosure. The DCI 602 may be used for transmission of a delay measurement, such as transmission of the delay measurement from the BS 105 to the UE 115 (e.g., at action 510 of FIG. 5). In some aspects, the DCI 602 may correspond to a PDCCH signal. As illustrated, the DCI 602 includes a DCI content field 604 (e.g., a data field), as well as cyclic redundancy check (CRC) bits (e.g., 606 and 608). In some aspects, the UE 115 may identify the DCI 602 as corresponding to the UE 115 and/or decode information included in the DCI content field 604 based on one or more of the CRC bits (606, 608) and/or information included in the DCI content field 604 itself. For clarity, a first set of CRC bits 606, such as a first eight CRC bits, are illustrated as separate from a second set of CRC bits 608, such as a last sixteen CRC bits. However, it may be appreciated that the first and second set of CRC bits (606, 608) may be included in a single set of CRC bits.

In some aspects, the DCI content field 604 may include the delay measurement. In such cases, to distinguish the delay measurement from other data, the BS 105 may provide an indication of the presence of the delay measurement within the DCI content field 604 to the UE 115. For instance, the BS 105 may use a radio network temporary identifier (RNTI) 610 to indicate the presence of the delay measurement within the DCI content field 604. More specifically, in some aspects, the BS 105 may mask the second set of CRC bits 608 (e.g., the last sixteen CRC bits) using an RNTI 610 indicating the presence of the delay measurement within the DCI 602 (e.g., within the DCI content field 604), as illustrated in FIG. 6. In some aspects, the BS 105 may use the RNTI 610 indicating the presence of the delay measurement in place of a different RNTI, such as a cell-RNTI (C-RNTI), used to mask the second set of CRC bits 608 when the delay measurement is not present within the DCI content field 604.

In such cases, the UE 115 may receive the DCI 602 transmitted from the BS 105 and may determine whether the DCI content field 604 includes the delay measurement based on the second set of CRC bits 608 and/or the RNTI 610. If the DCI content field 604 includes the delay measurement, the UE 115 may then determine the delay measurement based on the DCI content field.

In some aspects, the BS 105 may use a RNTI 710 indicating the presence of the delay measurement along with an additional RNTI, such as a cell-RNTI (C-RNTI) 712, as illustrated in FIG. 7. The RNTI 710 indicating the presence of the delay measurement may be similar to the RNTI 610. Moreover, the BS 105 may use the RNTI 710 indicating the presence of the delay measurement to mask the first set of CRC bits 606, and the BS 105 may use the C-RNTI 712 to mask the second set of CRC bits 608. In such cases, the UE 115 may receive the DCI 602 transmitted from the BS 105 and may determine whether the DCI content field 604 includes the delay measurement based on the first set of CRC bits 606 and/or the RNTI 710. If the DCI content field 604 includes the delay measurement, the UE 115 may then determine the delay measurement based on the DCI content field 604.

Additionally or alternatively, the BS 105 may indicate the presence of the delay measurement within the DCI content field 604 via indicators, such as a frequency resource indicator and/or a modulation and coding scheme indicator of the DCI 602. For instance, the BS 105 may reserve both the frequency resource indicator and the modulation and coding scheme indicator to indicate the presence of the delay measurement within the DCI content field 604. To that end, in response to detecting that the frequency resource indicator and the modulation and coding scheme indicator are reserved, which may otherwise correspond to an error, the UE 115 may identify a portion of the DCI content field 604 as corresponding to the delay measurement.

While aspects described herein relate to determination or reception of a delay propagation a UE (e.g., UE 115) such that the UE may compensate for the delay propagation, aspects of the disclosure are not limited thereto. Thus, it may be appreciated that the UE and/or the BS may additionally or alternatively determine the downlink propagation delay, which may correspond to part of the propagation delay (e.g., less than half the propagation delay, half the propagation delay, more than half the propagation delay), according to the techniques described herein.

Further, in some aspects, the UE (e.g., UE 115) and/or the BS (e.g., BS 105) may be configured to selectively use one or more of the techniques described herein to determine a delay measurement, such as the propagation delay between the UE and the BS. For instance, the UE and/or the BS may be configured to selectively employ the method 300, 400, 500, or a combination thereof. Moreover, the UE and/or the BS may be configured to selectively transmit a delay measurement via a DL subframe (e.g., an RRC message), the MAC-CE, and/or the PDCCH. In some instances, the UE and/or the BS may selectively use a combination of these techniques to minimize power consumption at the UE, minimize traffic in a network (e.g., network 100), and/or the like.

Figure 8:
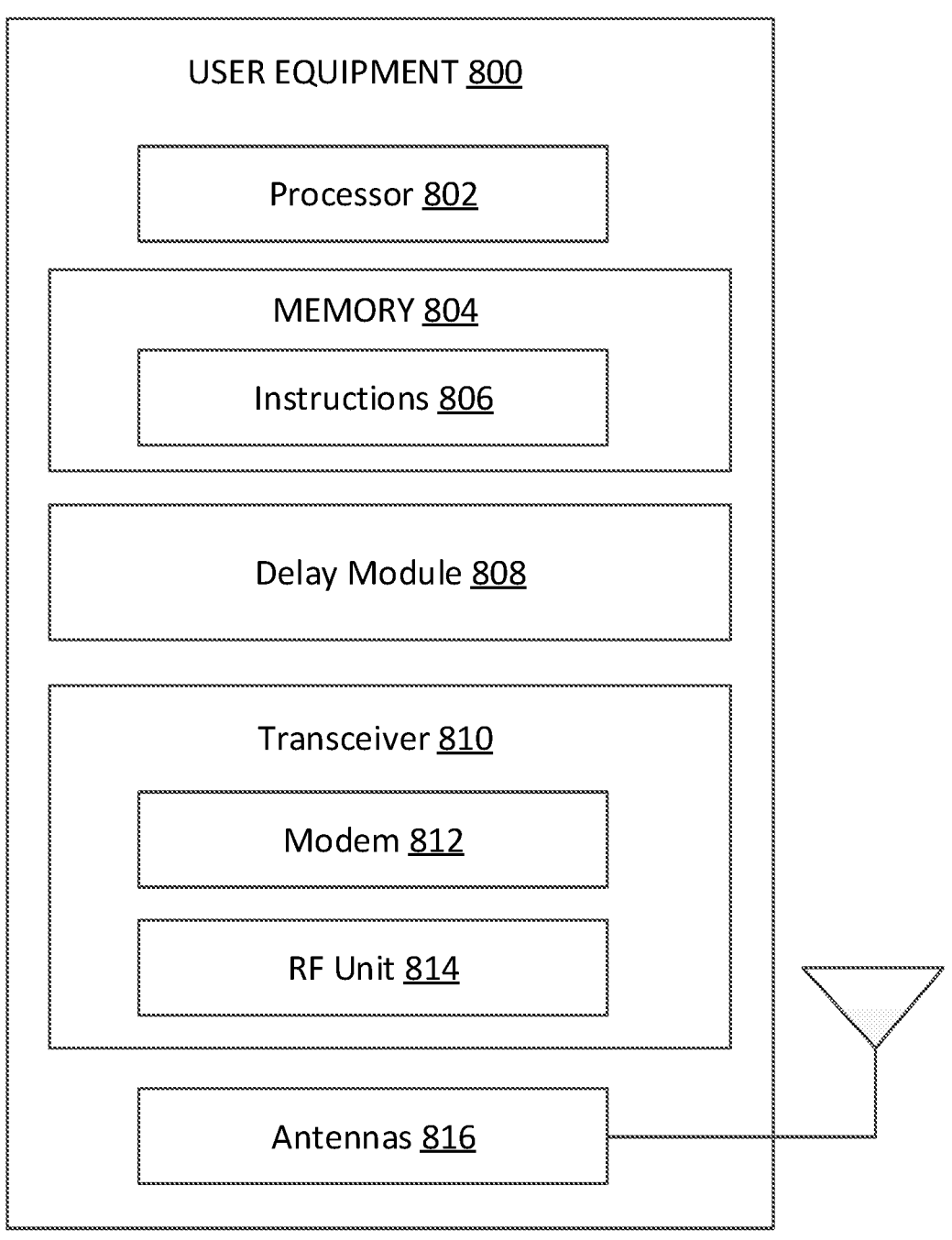
FIG. 8 is a block diagram of an exemplary UE according to some aspects of the present disclosure.

FIG. 8 is a block diagram of an exemplary UE 800 according to some aspects of the present disclosure. The UE 800 may be a UE 115 in the network 100 as discussed above in FIG. 1. As shown, the UE 800 may include a processor 802, a delay module 808, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The processor 802 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the processor 802 may include a non-transitory computer-readable medium. The processor 802 may store instructions 806. The instructions 806 may include instructions that, when executed by the processor 802, cause the processor 802 to perform operations described herein, for example, aspects of FIGS. 1-7 and 10. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The delay module 808 may be implemented via hardware, software, or combinations thereof. For example, the delay module 808 may be implemented as a processor, circuit, and/or instructions 806 stored in the processor 802 and executed by the processor 802. In some examples, the delay module 808 can be integrated within the modem subsystem 812. For example, the delay module 808 can be implemented by a combination of software components (e.g., executed by a DSP or a general processor) and hardware components (e.g., logic gates and circuitry) within the modem subsystem 812.

The delay module 808 may be used for various aspects of the present disclosure, for example, aspects of FIGS. 3-7 and 10. For example, the delay module 808 may be configured to receive a PRS from a BS (e.g., the BSs 105 and/or 900) to which the UE 800 is attached. The delay module 808 may be configured to transmit an SRS in response to and at a predetermined time after receiving the PRS. For instance, the delay module 808 may determine the fixed UE Rx-Tx time difference and may transmit the SRS based on the fixed Rx-Tx time difference. Further, the delay module 808 may receive a delay measurement from the BS via a DL subframe (e.g., an RRC message), a MAC-CE, a PDCCH, and/or the like. Moreover, in some aspects, the delay module 808 may determine a propagation delay between the BS and the UE based on the received delay measurement.

As shown, the transceiver 810 may include the modem subsystem 812 and the RF unit 814. The transceiver 810 can be configured to communicate bi-directionally with other devices, such as the UEs 115 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PDSCH signal, PDCCH signal, SRS resource configuration, SRS resource activation, SRS resource deactivation) from the modem subsystem 812 (on outbound transmissions) or of transmissions originating from another source such as a UE 115. The RF unit 814 may be further configured to perform analog beamforming in conjunction with the digital beamforming. Although shown as integrated together in transceiver 810, the modem subsystem 812 and/or the RF unit 814 may be separate devices that are coupled together at the UE 800 to enable the UE 800 to communicate with other devices.

The RF unit 814 may provide modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 115 according to some aspects of the present disclosure. The antennas 816 may further receive data messages transmitted from other devices and provide the received data messages for processing and/or demodulation at the transceiver 810. The transceiver 810 may provide the demodulated and decoded data (e.g., PUSCH signal, UL data, SRSs, UE capability reports, RI reports) to the delay module 808 for processing. The antennas 816 may include multiple antennas of similar or different designs to sustain multiple transmission links.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
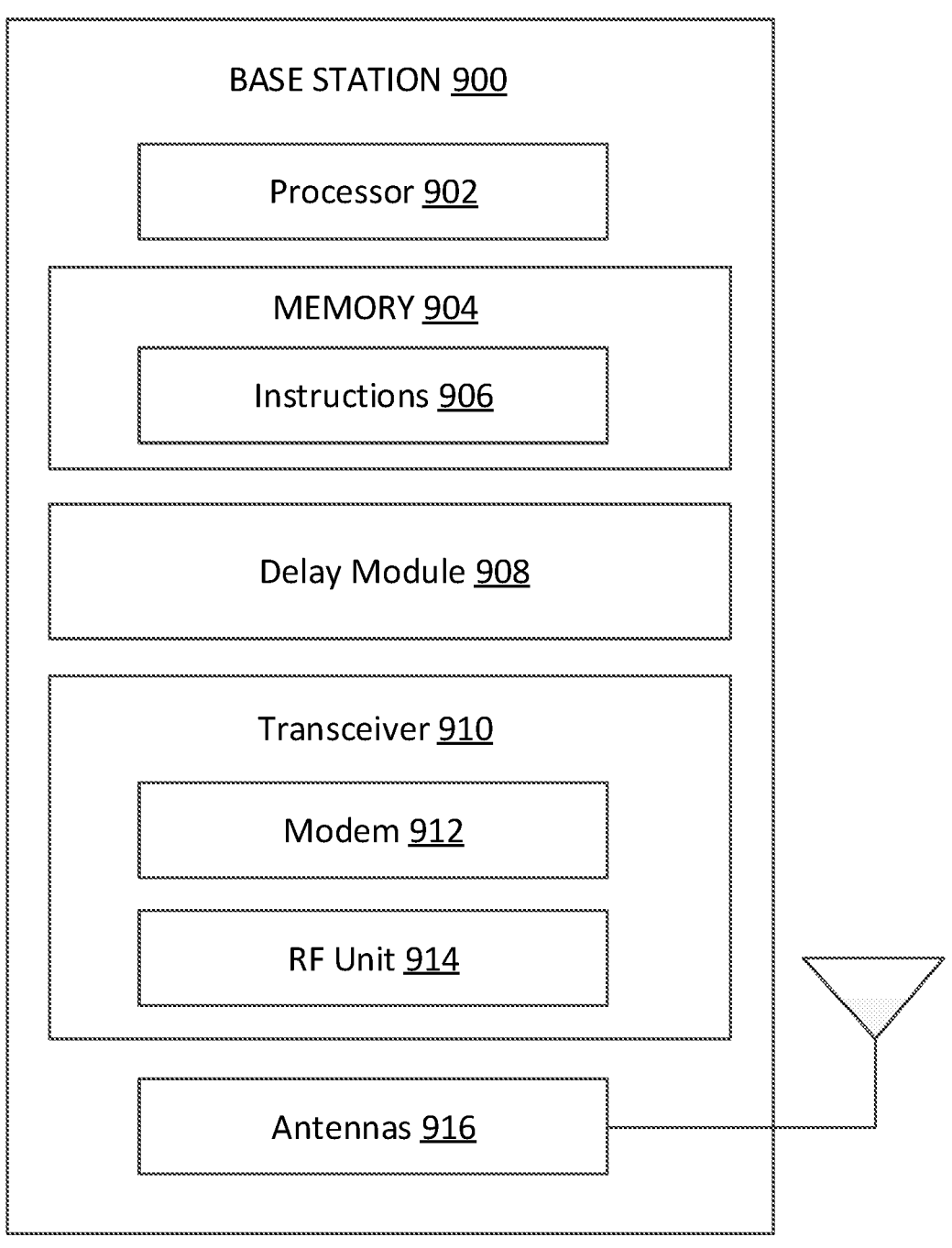
FIG. 9 is a block diagram of an exemplary BS according to some aspects of the present disclosure.

FIG. 9 is a block diagram of an exemplary BS 900 according to some aspects of the present disclosure. The BS 900 may be a BS 105 discussed above in FIG. 1. As shown, the BS 900 may include a processor 902, a memory 904, a delay module 908, a transceiver 910 including a modem subsystem 912 and a radio frequency (RF) unit 914, and one or more antennas 916. These elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to the BSs 105 in connection with aspects of the present disclosure, for example, aspects of FIGS. 1-7 and 11. Instructions 906 may also be referred to as program code, which may be interpreted broadly to include any type of computer-readable statement(s) as discussed above with respect to FIG. 8.

The delay module 908 may be implemented via hardware, software, or combinations thereof. For example the delay module 908 may be implemented as a processor, circuit, and/or instructions 906 stored in the memory 904 and executed by the processor 902. In some examples, the delay module 908 can be integrated within the modem subsystem 912. For example, the delay module 908 can be implemented by a combination of software components (e.g., executed by a DSP or a general processor) and hardware components (e.g., logic gates and circuitry) within the modem subsystem 912.

The delay module 908 may be used for various aspects of the present disclosure, for example, aspects of FIGS. 1-7 and 11. The delay module 908 may be configured to determine and/or transmit a PRS and/or response signal to a UE (e.g., UE 115, 800). The delay module 908 may additionally determine a delay measurement and generate and/or determine a message (e.g., a MAC-CE, DCI, RRC message, and/or the like) for transmission of the delay measurement. For instance, the delay module 908 may reserve the frequency resource indictor and the modulation and coding scheme indictor to indicate the presence of the delay measurement within the DCI. Additionally or alternatively, the delay module 908 may mask one or more CRC bits associated with the DCI with an RNTI indicating the presence of the delay measurement. Further, the delay module 908 may determine a fixed UE Rx-Tx time difference (e.g., fixed UE Rx-Tx time difference 504) for configuration at the UE and/or may dynamically configure the fixed UE Rx-Tx time difference.

As shown, the transceiver 910 may include a modem subsystem 912 and an RF unit 914. The transceiver 910 can be configured to communicate bi-directionally with other devices, such as the BSs 105. The modem subsystem 912 may be configured to modulate and/or encode the data from the memory 904 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., PUSCH signal, UL data, SRSs, UE capability reports, RI reports) from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the BS 900 to enable the BS 900 to communicate with other devices.

The RF unit 914 may provide modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., PDSCH signal, PDCCH, DL data, DCI, and/or the like) to the delay module 908. The antennas 916 may include multiple antennas of similar or different designs in order to sustain multiple transmission links. The RF unit 914 may configure the antennas 916.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

Figure 10:
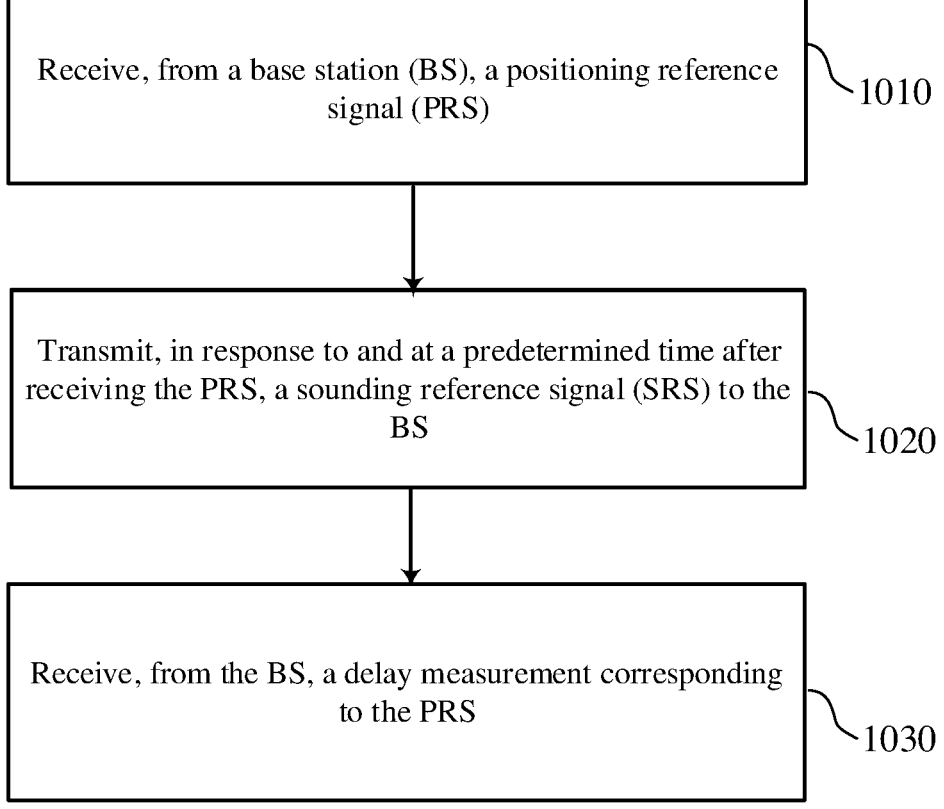
FIG. 10 is a flow diagram of a wireless communication method according to some aspects of the present disclosure.

FIG. 10 is a flow diagram of a wireless communication method 1000, according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UEs 115 and/or 800 may utilize one or more components, such as the processor 802, the memory 804, the delay module 808, the transceiver 810, the modem 812, and the one or more antennas 816, to execute the steps of method 1000. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, a UE (e.g., the UEs 115 and/or 800) can receive, from a BS (e.g., BS 105 and/or BS 900), a positioning reference signal (PRS). For instance, as discussed above with reference to FIG. 5, the UE may receive the PRS form the BS at action 502 via a DL subframe. Moreover, while aspects of the disclosure are described herein with reference to a PRS signal, the UE may additionally or alternatively receive another suitable signal from the BS, such as the response illustrated in FIGS. 3 and 4 (e.g., at action 304 and 404, respectively).

At block 1020, the UE may transmit, in response to and at a predetermined time after receiving the PRS, a sounding reference signal (SRS) to the BS. For instance, as discussed above with reference to FIG. 5, the UE Rx-Tx time difference may be fixed (e.g., preconfigured and/or predetermined). Thus, the UE may transmit the SRS to the BS at a time corresponding to the fixed UE Rx-Tx time difference 504 after receiving the PRS.

In some aspects of the method 1000, the UE may determine the predetermined time based on a configuration setting of the UE. Additionally or alternatively, the UE may receive, from the BS, an indication of the predetermined time. Further, in some aspects, the UE may receive, from the BS, an indication of the predetermined time within a first MAC-CE message. In some aspects, the UE may then receive an adjusted predetermined time from the BS and may transmit a second SRS to the BS in response to and at the adjusted predetermined time after receiving an additional signal from the BS.

At block 1030, the UE may receive, from the BS, a delay measurement corresponding to the PRS. As described above, the delay measurement may correspond to a propagation delay between the BS and the UE, a BS Tx-Rx time difference, a difference between a current and a previous BS Tx-Rx time difference, a difference between a previous and a current propagation delay, and/or the like. Moreover, the UE may receive the delay measurement from the BS via a DL subframe, a MAC-CE, the PDCCH, and/or the like.

In some aspects of the method 1000, the UE determines a propagation delay between the UE and the BS based on a reception-transmission time difference at the BS (e.g., a BS Rx-Tx time difference). For instance, the UE may receive the BS Rx-Tx time difference as the delay measurement from the BS and may determine the propagation delay based on the received BS Rx-Tx time difference.

In some aspects of the method 1000, the UE may receive the delay measurement from the BS via a MAC-CE message. In some aspects of the method 1000, the UE may receive from the BS via a PDCCH, downlink control information (DCI) including the delay measurement, as described above with reference to FIGS. 6-7. Further, in some aspects of the method 1000, the DCI further includes an indication that the delay measurement is included in the DCI. For example, the indication may be based on a frequency resource indicator and a modulation and coding scheme indicator of the DCI. Additionally or alternatively, the indication may be based on an RNTI indicating a presence of the delay measurement in the DCI. In such cases, for example, receiving the DCI may involve receiving, from the BS via the PDCCH, a first set of cyclic redundancy check (CRC) bits masked by the RNTI indicating the presence of the delay measurement in the DCI, as illustrated in FIGS. 6-7. Moreover, receiving the DCI may involve receiving, from the BS via the PDCCH, a second set of CRC bits masked by a C-RNTI, as illustrated in FIG. 7.

Figure 11:
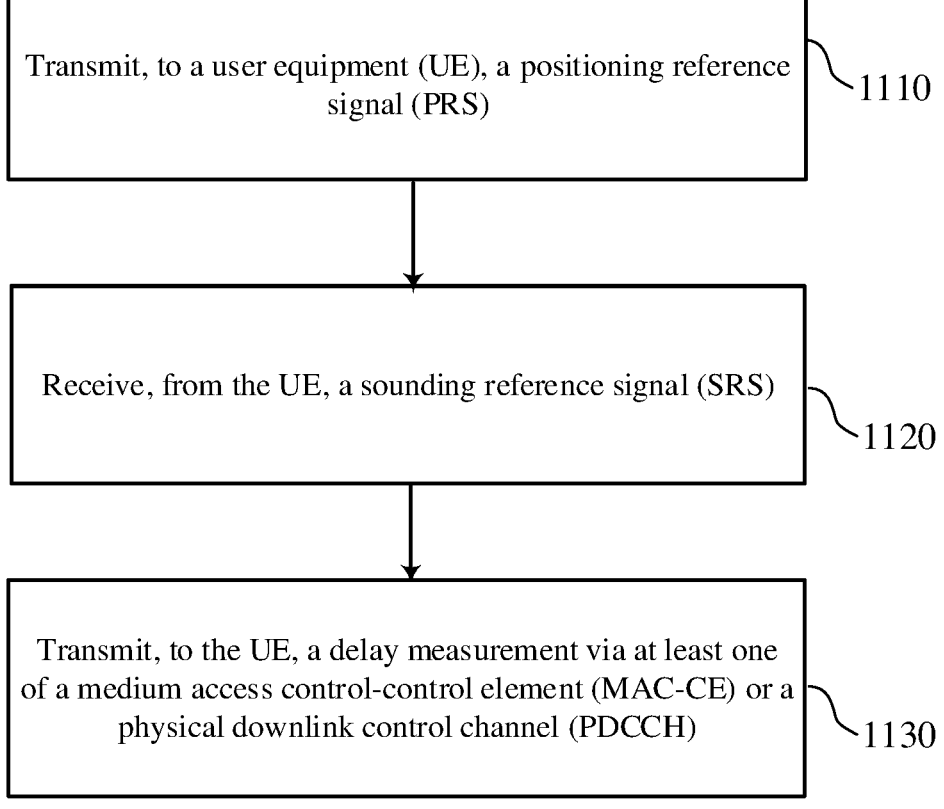
FIG. 11 is a flow diagram of a wireless communication method according to some aspects of the present disclosure.

FIG. 11 is a flow diagram of a wireless communication method 1100, according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the BSs 105 and/or 900 may utilize one or more components, such as the processor 902, the memory 904, the delay module 908, the transceiver 910, the modem 912, and the one or more antennas 916, to execute the steps of method 1100. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, a BS (e.g., the BSs 105 and/or 900) can transmit, to a UE (e.g., UEs 115 and/or 800), a positioning reference signal (PRS). For instance, the BS may transmit the PRS via a DL subframe, as described with reference to FIG. 5 (action 502). Moreover, while aspects of the disclosure are described herein with reference to a PRS signal, the BS may additionally or alternatively transmit another suitable signal to the UE, such as the response illustrated in FIGS. 3 and 4 (e.g., at action 304 and 404, respectively).

In some aspects of the method 1100, the BS may determine that a TA associated with the UE has changed from a first TA to a second TA, and the BS may transmit the PRS based on determining that the TA associated with the UE has changed. In some aspects of the method 1100, the BS may determine that a time has elapsed at a timer and may transmit the PRS based on determining the time has elapsed at the timer. In some aspects of the method 1100, the BS may determine that a distance between the UE and the BS has changed from a first distance to a second distance, and the BS may transmit the PRS based on determining that the distance between the UE and the BS has changed. In some aspects of the method 1100, the BS may transmit PRSs with respect to a periodicity. To that end, the BS may transmit the PRS based on the periodicity.

At block 1120, the BS may receive, from the UE a sounding reference signal (SRS). For instance, the BS may receive the SRS via a UL subframe as described herein. Further, in some aspects of the method 1100, the BS may receive the SRS based on a predetermined time, such as the fixed UE Rx-Tx time difference 504. To that end, in some aspects of the method 1100, the BS may transmit an indication of the predetermined time to the UE. For instance, the BS may transmit the indication of the predetermined time via a MAC-CE message. Further, in some aspects of the method 1100, the BS may transmit an indication of an adjusted predetermined time to the UE and transmit a second PRS to the UE. The BS may further receive a second SRS from the UE and may determine in response to receiving the second SRS and the adjusted predetermined time, an adjusted delay measurement corresponding to the SRS. In this way, the BS may dynamically configure the predetermined time (e.g., the fixed UE Rx-Tx time difference 504).

At block 1130, the BS may transmit, to the UE, a delay measurement via at least one of a medium access control-control element (MAC-CE) or a physical downlink control channel (PDCCH). As described herein, the delay measurement may correspond to a propagation delay between the UE and the BS, a difference between a previous and a current propagation delay between the UE and the BS, a Rx-Tx time difference measured at the BS (e.g., a BS Rx-Tx time difference), a difference between a previous and a current BS Rx-Tx time difference, and/or the like.

In some aspects of the method 1100, the BS may determine the delay measurement, which may correspond to the BS Rx-Tx time difference based on a delay measured between transmitting the PRS and receiving the SRS.

In some aspects of the method 1100, transmitting the delay measurement includes transmitting, to the UE via the PDCCH, DCI including the delay measurement. In some aspects, the DCI further includes an indication that the delay measurement is included in the DCI. For example, the indication may be based on a frequency resource indicator and a modulation and coding scheme indicator of the DCI. Additionally or alternatively, the indication may be based on an RNTI indicating a presence of the delay measurement in the DCI. In such cases, for example, transmitting the DCI may involve transmitting, to the UE via the PDCCH, a first set of cyclic redundancy check (CRC) bits masked by the RNTI indicating the presence of the delay measurement in the DCI, as illustrated in FIGS. 6-7. Moreover, transmitting DCI may involve transmitting, to the UE via the PDCCH, a second set of CRC bits masked by a C-RNTI, as illustrated in FIG. 7.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving, from a base station (BS), a positioning reference signal (PRS);
   transmitting, in response to and after a UE reception-transmission time difference following reception of the PRS, a sounding reference signal (SRS) to the BS; and
   receiving, from the BS, a delay measurement corresponding to the PRS, wherein the delay measurement is based at least in part on a BS reception-transmission time difference and the UE reception-transmission time difference.

2. The method of claim 1, further comprising:
   determining the UE reception-transmission time difference based on a configuration setting of the UE.

3. The method of claim 1, further comprising:
   receiving, from the BS, an indication of the UE reception-transmission time difference.

4. The method of claim 3,
   wherein the receiving the indication of the UE reception-transmission time difference comprises:
   receiving, from the BS, the UE reception-transmission time difference in a first medium access control-control element (MAC-CE) message.

5. The method of claim 4, further comprising:
   receiving, from the BS, an adjusted UE reception-transmission time difference;
   receiving, from the BS, an additional signal; and
   transmitting, in response to reception of the additional signal received from the BS and after the adjusted UE reception-transmission time difference following reception of the additional signal, a second SRS to the BS.

6. The method of claim 1,
   wherein the delay measurement corresponds to a propagation delay measurement between the UE and the BS.

7. The method of claim 1,
   wherein the delay measurement corresponds to a difference between a previous propagation delay measurement between the UE and the BS and a current propagation delay measurement between the UE and the BS.

8. The method of claim 1,
   wherein the delay measurement corresponds to the BS reception-transmission time difference.

9. A method of wireless communication performed by a base station (BS), the method comprising:
   transmitting, to a user equipment (UE), a positioning reference signal (PRS);
   receiving, from the UE, a sounding reference signal (SRS); and
   transmitting, to the UE, a delay measurement via at least one of a medium access control-control element (MAC-CE) or a physical downlink control channel (PDCCH), wherein the delay measurement is based at least in part on a BS reception-transmission time difference and a UE reception-transmission time difference.

10. The method of claim 9, further comprising:
   determining a timing advance (TA) associated with the UE has changed from a first TA to a second TA, wherein transmitting the PRS comprises transmitting the PRS based on determining the TA associated with the UE has changed.

11. The method of claim 9, further comprising:
   determining a time has elapsed at a timer, wherein transmitting the PRS comprises transmitting the PRS based on determining the time has elapsed at the timer.

12. The method of claim 9, further comprising:
   determining a distance between the UE and the BS has changed from a first distance to a second distance, wherein transmitting the PRS comprises transmitting the PRS based on determining the distance between the UE and the BS had changed.

13. The method of claim 9,
   wherein the BS is configured to transmit PRSs with respect to a periodicity, and wherein transmitting the PRS comprises transmitting the PRS based on the periodicity.

14. The method of claim 9, further comprising:
   transmitting, to the UE, an indication of the UE reception-transmission time difference, wherein the BS is configured to receive the SRS based on the UE reception-transmission time difference.

15. The method of claim 14,
wherein transmitting the indication of the UE reception-transmission time difference comprises:
  transmitting, to the UE, the indication of the UE reception-transmission time difference in a MAC-CE message.
16. A user equipment (UE), comprising:
a memory;
a processor; and
a transceiver; and
at least one processor coupled to the memory and the transceiver, wherein the UE is configured to:
  receive, from a base station (BS), a positioning reference signal (PRS);
  transmit, in response to and after a UE reception-transmission time difference following reception of the PRS, a sounding reference signal (SRS) to the BS; and
  receive, from the BS, a delay measurement corresponding to the PRS, wherein the delay measurement is based at least in part on a BS reception-transmission time difference and the UE reception-transmission time difference.
17. The UE of claim 16,
wherein the UE is further configured to:
  determine the UE reception-transmission time difference based on a configuration setting of the UE.
18. The UE of claim 16,
wherein the UE is further configured to:
  receive, from the BS, an indication of the UE reception-transmission time difference.
19. The UE of claim 18,
wherein, to receive the indication of the UE reception-transmission time difference, the UE is further configured to:
  receive, from the BS, the indication of the UE reception-transmission time difference in a first medium access control-control element (MAC-CE) message.
20. The UE of claim 19,
wherein the UE is further configured to:
  receive, from the BS, an adjusted UE reception-transmission time difference;
  receive, from the BS, an additional signal; and
  transmit, in response to reception of the additional signal and after the adjusted UE reception-transmission time difference following reception of the additional signal, a second SRS to the BS.
21. The UE of claim 16,
wherein the delay measurement corresponds to a propagation delay measurement between the UE and the BS.
22. The UE of claim 16,
wherein the delay measurement corresponds to a difference between a previous propagation delay measurement between the UE and the BS and a current propagation delay measurement between the UE and the BS.

23. The UE of claim 16,
wherein the delay measurement corresponds to the BS reception-transmission time difference.
24. A base station (BS), comprising:
a memory;
a processor; and
a transceiver; and
at least one processor coupled to the memory and the transceiver, wherein the BS is configured to:
  transmit, to a user equipment (UE), a positioning reference signal (PRS);
  receive, from the UE, a sounding reference signal (SRS); and
  transmit, to the UE, a delay measurement via at least one of a medium access control-control element (MAC-CE) or a physical downlink control channel (PDCCH), wherein the delay measurement is based at least in part on a BS reception-transmission time difference and a UE reception-transmission time difference.
25. The BS of claim 24,
wherein the BS is further configured to:
  determine a timing advance (TA) associated with the UE has changed from a first TA to a second TA; and
  wherein, to transmit the PRS, the BS is configured to transmit the PRS based on determining the TA associated with the UE has changed.
26. The BS of claim 24,
wherein the BS is further configured to:
  determine a time has elapsed at a timer; and
  wherein, to transmit the PRS, the BS is configured to transmit the PRS based on determining the time has elapsed at the timer.
27. The BS of claim 24,
wherein the BS is further configured to:
  determine a distance between the UE and the BS has changed from a first distance to a second distance; and
  wherein, to transmit the PRS, the BS is configured to transmit the PRS based on determining the distance between the UE and the BS had changed.
28. The BS of claim 24,
wherein the BS is further configured to transmit PRSs with respect to a periodicity, and
wherein, to transmit the PRS, the BS is configured to transmit the PRS based on the periodicity.
29. The BS of claim 24,
wherein the BS is further configured to:
  transmit, to the UE, an indication of the UE reception-transmission difference, wherein the BS is configured to receive the SRS based on the UE reception-transmission time difference.
30. The BS of claim 29,
wherein, to transmit the indication of the UE reception-transmission time difference, the BS is configured to:
  transmit, to the UE, the indication of the UE reception-transmission time difference in a MAC-CE message.

* * * * *